United States Patent Office 2,745,783
Patented May 15, 1956

2,745,783
SUBSTITUTED 1.2-DIPHENYL-3.5-DIOXO-PYRAZOLIDINES

Franz Häfliger, Basel, Switzerland, assignor to J. R. Geigy A. G., Basel, Switzerland, a Swiss firm No Drawing. Application April 1, 1954,
Serial No. 420,471

Claims priority, application Switzerland November 6, 1950

5 Claims. (Cl. 167—65)

This application is a continuation-in-part of copending application Serial No. 253,228, filed October 25, 1951, and since granted as U. S. Patent No. 2,674,600, issued April 6, 1954.

The present invention is concerned with new derivatives of 1.2-diphenyl-3.5-dioxo-pyrazolidine which have an analgetic, antipyretic and, in particular, antiphlogistic action. It is also concerned with their salts with inorganic and organic bases as well as with the production of the new compounds.

1.2-diphenyl-3.5-dioxo-4-n-butyl-pyrazolidine has attained great importance as a medicament for the treatment of rheumatic diseases. Analogous compounds containing one or more hydroxyl groups in one or both phenyl radicals corresponding to the general formula:

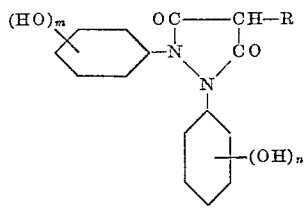

I or the tautomeric forms thereof wherein

R represents a hydrocarbon radical having at least 2 carbon atoms and linked to the pyrazolidine ring by a non-quaternary carbon atom,
$m$ represents an integer from 1 to 3 and
$n$ represents an integer from 0 to 3, have not been known up to now.

The compounds defined above can be produced principally by condensation of reactive derivatives of correspondingly substituted malonic acids with functional derivatives of hydroxy hydrazobenzenes in which the hydroxyl group or groups are closed by linkages of ether, acetal or ester-like nature, so that the hydroxyl group or groups are protected during the condensation from reacting with the malonic acid derivative as well as from oxidation and other unwanted side reactions. On completition of the condensation, the radicals protecting the hydroxyl groups must be split off without altering the remaining part of the molecule. Thus the functional derivatives of hydroxy hydrazobenzenes must be on the one hand stable to the condensation process and on the other hand able to split easily on the completion thereof. Certain araliphatic ethers of hydroxy hydrazobenzenes, in particular mono- or poly-benzyloxy or -benzhydryloxy hydrazobenzenes fulfill this condition best as they can be easily condensed both with substituted malonic acid esters by means of alkaline condensation agents as well as with substituted malonic acid halides to form aralkyloxyphenyl substituted dioxo-pyrazolidines, which latter can be converted into hydroxy compounds of the general formula I by hydrogenolysis by means of catalytically activated hydrogen. Because of their stability to alkaline condensation agents, also derivatives of hydroxy hydrazobenzenes in which the hydroxyl group or groups are bound by an acetal-like linkage are suitable for the condensation with substituted malonic esters. They produce condensation products which can be easily converted into compounds of the general Formula I by hydrolysis with acids. Esters of hydroxy hydrazobenzenes and also acetals of hydroxy azobenzenes can be condensed with halides of substituted malonic acids in the presence of acid binding agents whereupon compounds of the general Formula I can be obtained by hydrolysis, preferably in an alkaline medium or in an acid medium, or in an acid medium respectively.

The production of the new compounds of the general Formula I is thus characterised by reacting in the presence of an alkaline condensation agent, a substituted malonic acid ester of the general formula:

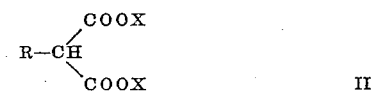

II wherein X represents a lower alkyl radical or a phenyl radical, with a derivative of a hydroxy hydrazobenzene corresponding to one of the two formulae:

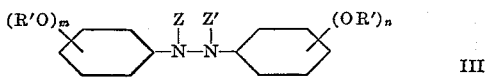

III and

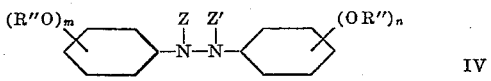

IV wherein:

R' represents an araliphatic radical which can be split off by hydrolysis, in particular a benzyl or benzhydryl radical, or
R" represents an α-alkoxy-alkyl radical wherein the alkoxy and alkyl group can form a ring among themselves, and
Z and Z' each represents hydrogen or an acyl radical which can be easily split off, or by reacting a substituted malonic acid halide of the general formula:

V wherein Y represents chlorine or bromine, with a derivative of a hydroxy hydrazo benzene of the general formula:

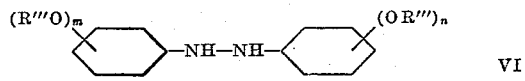

VI wherein R''' represents an acyl radical which can be easily split off, or with a derivative of a hydroxy hydrazobenzene of the general Formulae III or IV and then subjecting the condensation products so obtained of the general formula:

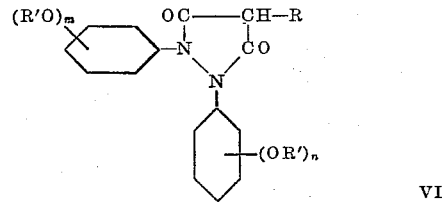

VII to hydrogenolysis by means of catalytically activated hydrogen, or treating condensation products of the general formula:

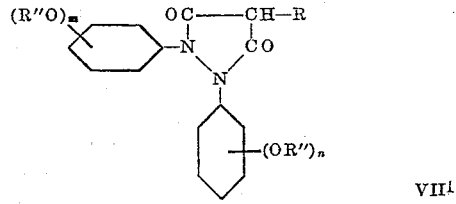

VIII with acid hydrolysing agents or treating condensation products of the general formula:

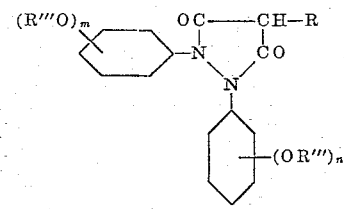

with acid or alkaline hydrolysing agents.

Among these possibilities for the preparation of the new compounds, the preferred method is the condensation of substituted malonic acid alkyl esters with aralkyloxy hydrazobenzenes of the general Formula III in the presence of alkaline condensing agents such as sodium alkylates in lower aliphatic alcohols, e. g. with sodium ethylate in ethanol. The hydrogenolysis of the condensation products of the general formula VII then follows, for example in the presence of an alloy skeleton catalyst such as Raney nickel or Raney cobalt, or in the presence of a noble metal catalyst such as palladium on charcoal with hydrogen in an inert solvent such as ethyl acetate or ethanol.

A great number of substituted malonic acid esters of the general Formula II are already known and easily obtained by reacting sodium compounds of corresponding unsubstituted malonic acid esters, in particular the diethyl esters, with halogen compounds of the general formula R—Cl, R—Br or R—I. Some of the substituted malonic acid esters may be prepared advantageously by condensation of easily accessible ketones or aldehydes with malonic acid esters and simultaneous or subsequent hydrogenation. Substituted malonic acid halides of the general Formula VI can be obtained from the corresponding esters by alkaline saponification, liberation of the acids in the cold and reacting with inorganic acid halides such as thionyl chloride, PCl₃, phosphorus pentachloride or phosphorus tribromide. In the substituted malonic acid esters and halides used in the reaction and therefore in the end products of the general Formula I the radical R can be represented by, for example, an ethyl, propyl, isopropyl, butyl, isobutyl, sec. butyl, amyl, isoamyl, hexyl, α-isobutyl-ethyl, heptyl, β-ethyl-hexyl, dodecyl, octadecyl, allyl, butene-2-yl, methallyl, cyclopentyl, cyclohexyl, benzyl, p-chlorobenzyl, m.p-dichlorobenzyl, β - phenylethyl, γ - phenyl - propyl, or δ-phenyl-butyl radical.

When the malonic acid derivatives are condensed with aralkyloxy hydrazobenzenes and the resulting products are subjected to hydrogenolysis, unsaturated aliphatic chains in the radicals R can be hydrogenated simultaneously and compounds with the corresponding radical R with a saturated aliphatic chain can be obtained. However, since malonic acid derivatives with suitable unsaturated radicals R are in no case easier to obtain than the corresponding compounds without aliphatic double bonds, they are of little interest for the preparation of end products with saturated aliphatic chains. In the preparation of compounds with a radical R containing an aliphatic double bond it is of advantage to avoid hydrogenolysis and therefore the method starting from acetals of hydroxy hydrazobenzene is chosen.

The series of benzyloxy and benxhydryloxy hydrazobenzenes offers the widest range of isomeric functional derivatives of hydroxy hydrazobenzenes. This is due to the possibility of preparing symmetrical dibenzyloxy or tetrabenzyloxy hydrazobenzenes by the reduction of mono- or di-benzyloxy nitrobenzenes respectively, for example, m.m'-dibenzyloxy hydrazobenzene from m-benzyloxy nitrobenzene by heating with alkali hydroxide, and is especially due to the easy reduction of the benzyloxy or benzhydryloxy azobenzenes, for example, by zinc in an alkaline medium.

The benzyloxy azobenzenes used for the reductions can be prepared by etherifying corresponding mono- or poly-hydroxy azobenzenes, e. g. by reacting their sodium salts with benzyl chloride or bromide. P-hydroxy azobenzene, o-p-dihydroxy azobenzene and m.p-dihydroxy azobenzene are obtained by coupling benzene diazonium chloride with phenol, resorcinol or pyrocatechol respectively. However, when benzyloxy benzene diazonium chlorides are used instead of the unsubstituted compound, eventually polybenzyloxy substituted hydrazobenzenes can be obtained with benzyloxy groups substituted in both phenyl radicals, but if desired, in different positions. Further, benzene diazonium chloride or its benzyloxy derivatives can be coupled with benzyloxy phenols, e. g. with o-benzyloxy phenol, whereby eventually polybenzyloxy hydrazobenzenes with still other relative positions of the benzyloxy groups such as, e. g., o.m'-dibenzyloxy hydrazobenzene, can be prepared.

Asymmetric benzyloxy hydrazobenzene can however also be prepared by heating equimolecular mixtures of nitrobenzene or benzyloxy nitrobenzene and benzyloxy-anilines or aniline with alkali hydroxides.

The acetal linkages as well as ester linkages are formed advantageously at the azo stage. Acetals of hydroxy azobenzenes are obtained for example by heating hydroxy azobenzenes in dihydropyran in the presence of a trace of phosphorus pentoxide, or reacting them in the presence of a trace of hydrogen chloride with a vinyl ether or by reacting sodium azophenolates in an inert solvent such as, e. g., benzene with chloromethyl alkyl ethers. The reduction of these acetals to acetals of hydroxy hydrazobenzenes must be performed in an alkaline medium, e. g. by means of zinc dust in an alkaline medium. The usual acylating methods can serve for the esterification of the hydroxy azobenzenes, e. g. the reaction of an acid anhydride in the presence of sodium acetate or of an acid chloride in aqueous alkali lye or in pyridine. The acyloxy hydrazobenzenes must be reduced in as neutral a medium as possible, e. g., by dissolving the acyloxy hydrazobenzene and suspending the zinc dust in a suitable solvent and slowly adding glacial acetic acid dropwise until the solution becomes colourless and thereupon filtering the reaction mixture immediately.

Among the processes for the manufacture of substituted malonic acid esters, the condensation of suitable ketones and aldehydes with malonic acid esters and hydrogenation of the condensation products has been described above. In an analogous manner it is also possible to introduce the radical R into such functional derivatives of 1.2-diphenyl-3.5-dioxo-pyrazolidines containing hydroxy groups, which differ from the pyrazolidines of the general Formulae VII, VIII and IX in that they carry a hydrogen atom instead of the radical R in position 4. The radical R is introduced by condensation with ketones or aldehydes and simultaneous or subsequent hydrogenation by means of hydrogen catalytically activated with Raney nickel or noble metals. Cyclohexanone and cyclopentanone, but also benzaldehyde and substituted benzaldehydes are particularly suitable for this condensation process. This process is of special interest when aralkyloxy substituted 1.2-diphenyl-3.5-dioxo-pyrazolidines are used as starting materials, because in this case the hydrogenation of the semicyclic double bond and the splitting off of the benzyloxy group or groups can be carried out in the same step of the manufacture.

The new compounds with alkali hydroxides form monobasic salts which are fairly easily to easily soluble. Solutions can be produced directly by dissolving the new compounds in the calculated amount of alkali lye, i. e. in lithium, sodium or potassium hydroxide solutions. They can also be dissolved in alkali carbonate solutions. In view of this fact as well as from comparisons with analogous compounds not having phenolic hydroxy groups, it can be concluded that the monobasic salts are formed by the neutralisation of the strongly acid enolic hydroxyl group of the tautomeric enol forms:

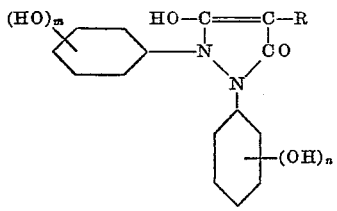

(X)

or

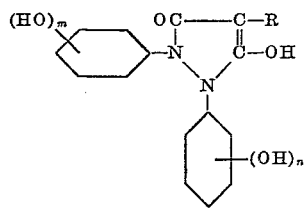

(XI)

The new compounds prepared according to the invention may be made into pharmaceutical compositions by admixture thereof with suitable and compatible pharmaceutical carriers.

The above described solutions of the alkali salts of the new compounds have only a weakly alkaline reaction and are, therefore, very suitable for injection purposes.

The pharmaceutical compositions may also be in the form of capsules, powders, tablets, or any other form which is suitable for administration per os. The compositions may be obtained by admixing the active ingredients, i. e. the new substituted 1.2-diphenyl-3.5-dioxopyrazolidines with pharmaceutical carriers such as cornstarch, lactose, stearic acid, talc, magnesium stearate, etc.

The following examples further illustrate the production of the new compounds. Parts are given as parts by weight and the relationship of parts by weight to parts by volume is as that of grammes to cubic centimeters. The temperatures are given in degrees centigrade.

After 6 hours the calculated amount of hydrogen has been taken up. The residue obtained after filtering and evaporating, is taken up in benzene and extracted twice with diluted sodium carbonate solution. The alkali extract is then made acid to congo red with 6 N-hydrochloric acid and the precipitate is taken up in ethyl acetate. The solution obtained is washed twice with salt solution, dried with sodium sulphate and evaporated. The residue is recrystallised from ether/petroleum ether. 1-(p-hydroxyphenyl)-2-phenyl-4-n-butyl-3.5-dioxo-pyrazolidine melts at 124–125°.

1 - (p - hydroxy - phenyl) - 2 - phenyl - 4 - n - amyl- 3.5 - dioxo - pyrazolidine and 1 - (p - hydroxy - phenyl)- 2-phenyl-4-benzyl-3.5-dioxopyrazolidine can be prepared in the same manner by using 460 parts of n-amyl malonic acid diethyl ester or 500 parts of benzyl malonic acid diethyl ester respectively instead of n-butyl malonic acid ethyl ester.

*Example 2*

43.2 parts of n-butyl malonic acid ethyl ester are poured into a solution of 4.6 parts of sodium in 92 parts by volume of abs. alcohol, 53 parts of m.m'-bis-benzyloxy hydrazobenzene (M. P. 109–110°) are added, about two thirds of the alcohol is distilled off and 92 parts by volume of abs. xylene are added. Without removing the sloping condenser, the mixture is stirred for 12 hours at a bath temperature of 140–145°, and then cooled to 0–5°. 100 parts of ice are added, the xylene is removed, the aqueous solution is extracted twice with chloroform and made acid to congo red at 0–5° with 6 N-hydrochloric acid. The precipitate is taken up in chloroform, the solution obtained is washed twice with water, then with sodium chloride solution, dried over sodium sulphate and evaporated in the vacuum (bath temperature 20°). The residue is recrystallised from alcohol and produces 1.2-bis-(m-benzyloxy-phenyl)-4-n-butyl-3.5-dioxo-pyrazolidine as a felty white crystal mass which melts at 104°.

8.2 parts of the dibenzyloxy compound are suspended in 82 parts of ethyl acetate and, in the presence of 8.2

*Example 1*

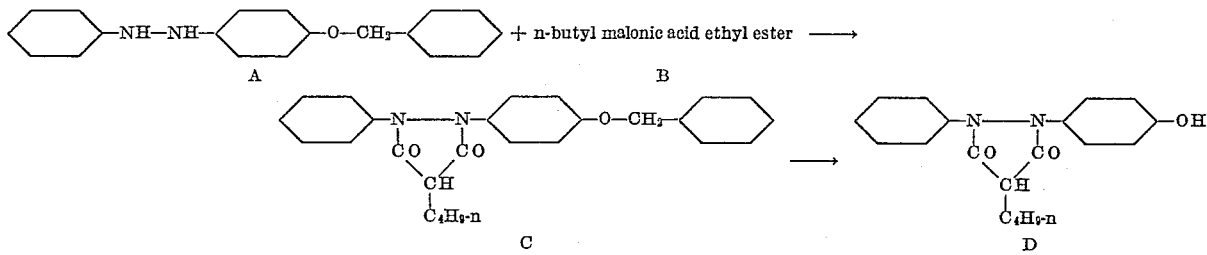

43.2 parts of n-butyl malonic acid ethyl ester (B) are added to a solution of 4.6 parts of sodium in 92 parts by volume of abs. alcohol. 39 parts of p-benzyloxy hydrazobenzene (A) (M. P. 88–90°) are added. About two-thirds of the alcohol is distilled off and 92 parts by volume of abs. xylene are added. Without removing the sloping condenser, the mixture is stirred for 12 hours at a bath temperature of 140–145°. It is then cooled to 0–5°, 100 parts of ice are added, the xylene is removed, the aqueous solution is extracted twice with chloroform and made acid to congo red at 0–5° with 6 N-hydrochloric acid. The precipitate is taken up in chloroform, the solution obtained is washed twice with water, then with saturated salt solution, dried over Na₂SO₄ and evaporated in the vacuum (bath temperature 20°). The residue is recrystallised from alcohol and produces 1-(p-benzyloxyphenyl)-2-phenyl-4-n-butyl-3.5-dioxo-pyrazolidine (C) as tiny white needles which melt at 132–133°.

16.6 parts of C are suspended in 166 parts by volume of ethyl acetate and, in the presence of 16.6 parts of Raney nickel, hydrogen is allowed to act at room temperature and atmospheric pressure.

parts of Raney nickel, hydrogen is allowed to act at room temperature under atmospheric pressure.

After 8½ hours the calculated amount of hydrogen has been taken up. The filtered and concentrated solution is shaken with diluted sodium carbonate solution and benzene whereupon a sodium salt crystallises out. This is filtered with suction, washed with a little water, suspended in ether whereupon diluted hydrochloric acid is added and the mixture is shaken to dissolve the crystals. The ethereal solution is washed with saturated sodium chloride solution, dried with Na₂SO₄ and evaporated. The residue is recrystallised from methanol/water. 1.2-bis - (m - hydroxy - phenyl) - 4 - n - butyl - 3.5 - dioxo-pyrazolidine forms granular crystals which melt at 194–195°.

1 - (m - hydroxy - phenyl) - 2 - phenyl - 4 - n - butyl- 3.5-dioxo-pyrazolidine is obtained in an analogous manner. Melting point of the m-benzyloxy hydrazobenzene is about 70° (not recrystallised) and the melting point of 1-(m-benzyloxy-phenyl)-2-phenyl-3.5-dioxo-4-n-butyl-pyrazolidine is 124–125°. The hydrogenation also proceeds in an analogous manner when using 0.7 part of benzyloxy compound, 1.4 parts of ethyl acetate, 0.7 part of Raney nickel. It is completed in 4½ hours whereupon the product is recrystallised from methanol/water. M. P. 137–139°.

In the same manner, e. g. also 1.2-bis-(m-hydroxyphenyl)-4-isopropyl-3.5-dioxo-pyrazolidine can be prepared by starting from 40.4 parts of isopropyl malonic acid diethyl ester instead of n-butyl malonic acid diethyl ester; 1.2-bis-(m-hydroxy-phenyl)-4-n-dodecyl-3.5-dioxo-pyrazolidine can be prepared from 65.6 parts of n-dodecyl malonic acid diethyl ester; 1.2-bis-(m-hydroxyphenyl)-4-cyclohexyl-3.5-dioxo-pyrazolidine can be prepared from 48.4 parts of cyclohexyl malonic acid diethyl ester and 1.2-bis-(m-hydroxy-phenyl)-4-(γ-phenyl-propyl)-3.5-dioxo-pyrazolidine can be prepared from 55.6 parts of (γ-phenyl-propyl)-malonic acid diethyl ester.

What I claim is:

1. In a process for the manufacture of a substituted 1.2-diphenyl-3.5-dioxo-pyrazolidine corresponding to the general formula:

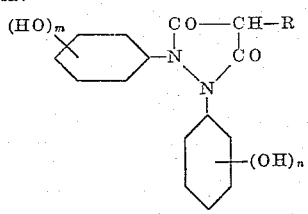

wherein:

R represents a hydrocarbon radical containing 2 to 18 carbon atoms and linked to the pyrazolidine nucleus by a non-quaternary carbon atom,
$m$ represents an integer from 1 to 3 and
$n$ represents an integer from 0 to 3, comprising reacting a compound corresponding to the formula:

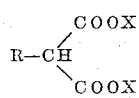

wherein:

R has the meaning defined above, and
X represents a member selected from the group consisting of a lower alkyl and a phenyl radical with a compound corresponding to the formula:

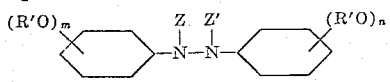

wherein:

R' represents a member selected from the group consisting of a benzyl and a benzhydryl radical,
$m$ and $n$ have the meanings defined above,
Z and Z' represent a member selected from the group consisting of hydrogen and an acyl radical, the step of subjecting the condensation product so obtained to hydrogenolysis by means of Raney alloy catalyst activated hydrogen at ordinary temperature and atmospheric pressure.

2. A substituted 1.2-diphenyl-3.5-dioxo-pyrazolidine corresponding to the general formula:

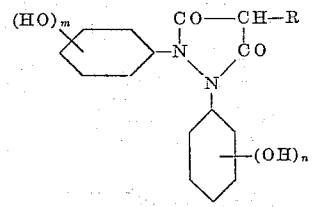

wherein:

R represents a hydrocarbon radical containing 2 to 18 carbon atoms and linked to the pyrazolidine nucleus by a non-quaternary carbon atom,
$m$ represents an integer from 1 to 3, and
$n$ represents an integer from 0 to 3.

3. A pharmaceutical composition comprising a substituted 1.2-diphenyl-3.5-dioxo-pyrazolidine corresponding to the general formula:

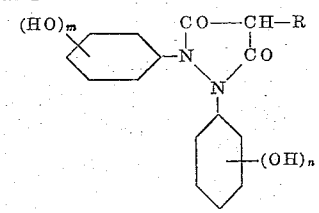

wherein:

R represents a hydrocarbon radical containing 2 to 18 carbon atoms and linked to the pyrazolidine nucleus by a non-quaternary carbon atom,
$m$ represents an integer from 1 to 3 and
$n$ represents an integer from 0 to 3, and a pharmaceutical carrier therefor.

4. 1-p-hydroxyphenyl-2-phenyl-4-n-butyl-3.5-dioxo-pyrazolidine.

5. 1-(m-hydroxyphenyl)-2-phenyl-4-n-butyl-3.5-dioxo-pyrazolidine.

References Cited in the file of this patent

UNITED STATES PATENTS

| | | |
|---|---|---|
| 2,427,911 | Kendall et al. | Sept. 23, 1947 |
| 2,562,830 | Stenzl | July 31, 1951 |

FOREIGN PATENTS

| | | |
|---|---|---|
| 1,049,539 | France | Aug. 19, 1953 |

OTHER REFERENCES

Van Duzee et al.; JACS, vol. 57, pp. 147–50 (1935).
Adkins: "Reactions of Hydrogen" (Wisconsin), p. 73 (1937).
Tomita et al.: Chem. Abst., vol. 41, 4121 (1947).